United States Patent
Yamamoto et al.

(10) Patent No.: US 9,435,926 B2
(45) Date of Patent: Sep. 6, 2016

(54) LIGHT GUIDE BODY, RELAY APPARATUS, AND SPEAKER APPARATUS

(71) Applicant: Yamaha Corporation, Hamamatsu-shi, Shizuoka (JP)

(72) Inventors: Masaki Yamamoto, Hamamatsu (JP); Yoshiaki Kawaida, Hamamatsu (JP); Koji Suzuki, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/424,465

(22) PCT Filed: Aug. 16, 2013

(86) PCT No.: PCT/JP2013/072027
§ 371 (c)(1),
(2) Date: Feb. 27, 2015

(87) PCT Pub. No.: WO2014/034447
PCT Pub. Date: Mar. 6, 2014

(65) Prior Publication Data
US 2015/0212248 A1 Jul. 30, 2015

(30) Foreign Application Priority Data

Aug. 30, 2012 (JP) ................................. 2012-190485

(51) Int. Cl.
*H04B 10/00* (2013.01)
*F21V 8/00* (2006.01)
(Continued)

(52) U.S. Cl.
CPC ............... *G02B 6/0008* (2013.01); *G02B 6/00* (2013.01); *G02B 6/0046* (2013.01); *G08C 23/04* (2013.01);
(Continued)

(58) Field of Classification Search
CPC H04B 10/29; H04B 10/1141; G02B 6/0008; G02B 6/00; G02B 6/0046; G02B 6/0018; G02B 6/002; G02B 6/0088; G02B 6/0028; G08C 23/04; G08C 2201/40; H04N 5/00; H04N 5/60; H04N 5/64; H04N 5/66; H04Q 9/00; H04R 1/02; H04R 1/028; H04R 1/403
USPC ....... 398/106, 107, 113, 114, 173, 162, 195, 398/178, 180, 135–139
See application file for complete search history.

(56) References Cited

U.S. PATENT DOCUMENTS 5,857,761 A * 1/1999 Abe ........................ G02B 6/001
362/268
7,809,274 B2 * 10/2010 Wu ..................... H04B 10/1141
398/106
(Continued)

FOREIGN PATENT DOCUMENTS

| JP | 8-256387 A | 10/1996 |
| JP | 9-275591 A | 10/1997 |

(Continued)

OTHER PUBLICATIONS

International Search Report (PCT/ISA/210) dated Sep. 10, 2013 with English-language translation (Four (4) pages).

(Continued)

*Primary Examiner* — Hibret Woldekidan
(74) *Attorney, Agent, or Firm* — Crowell & Moring LLP

(57) ABSTRACT

In the vicinity of the outgoing-side end portion 202 of a light guide rod 20, the rear face thereof is formed into an inclined face 23 being inclined in a tapered shape toward the side face. The infrared ray having advanced toward the flat face of the outgoing-side end portion 202 is reflected by the inclined face 23. The infrared ray reflected by the inclined face 23 is refracted by the side face of the light guide rod 20 and irradiated, thereby being irradiated while being expanded toward the outgoing-side end portion 202. Hence, a bar speaker 1 can irradiate the infrared ray in a wide range beyond the width of the housing 10 thereof.

6 Claims, 11 Drawing Sheets

(51) Int. Cl.
*G08C 23/04* (2006.01)
*H04R 1/40* (2006.01)
*G02B 6/00* (2006.01)
*H04N 5/00* (2011.01)
*H04Q 9/00* (2006.01)
*H04R 1/02* (2006.01)
*H04B 10/29* (2013.01)
*H04N 5/60* (2006.01)
*H04N 5/64* (2006.01)
*H04N 5/66* (2006.01)

(52) U.S. Cl.
CPC ............ *H04B 10/29* (2013.01); *H04N 5/00* (2013.01); *H04Q 9/00* (2013.01); *H04R 1/02* (2013.01); *H04R 1/028* (2013.01); *H04R 1/403* (2013.01); *G02B 6/002* (2013.01); *G02B 6/0018* (2013.01); *G02B 6/0088* (2013.01); *G08C 2201/40* (2013.01); *H04N 5/60* (2013.01); *H04N 5/64* (2013.01); *H04N 5/66* (2013.01)

(56) References Cited

U.S. PATENT DOCUMENTS

| | | | | |
|---|---|---|---|---|
| 7,929,863 B2* | 4/2011 | Yu | ............... | G08C 17/02 398/109 |
| 7,932,811 B2* | 4/2011 | Tanabe | ............... | G08C 23/04 340/426.13 |
| 8,295,707 B2* | 10/2012 | Wu | ............... | H04B 10/1141 398/106 |
| 8,310,373 B2* | 11/2012 | Feight | ............... | H04B 10/1141 324/500 |
| 8,335,436 B2* | 12/2012 | Machida | ............... | H04M 1/0235 398/130 |
| 8,909,055 B2* | 12/2014 | Kawaida | ............... | G08C 23/04 398/106 |
| 9,081,125 B2* | 7/2015 | Dau | ............... | F21V 7/0008 |
| 9,335,462 B2* | 5/2016 | York | ............... | G02B 6/0006 |
| 2001/0027125 A1* | 10/2001 | Kiyomatsu | ............... | H04M 1/0266 455/566 |
| 2007/0290885 A1* | 12/2007 | Tanabe | ............... | G08C 23/04 340/13.24 |
| 2007/0291966 A1* | 12/2007 | Tanijiri | ............... | G02B 27/0176 381/306 |
| 2011/0157491 A1* | 6/2011 | Shimizu | ............... | G02B 6/0046 348/790 |
| 2011/0211141 A1* | 9/2011 | Cho | ............... | G02B 6/002 349/61 |
| 2012/0293722 A1* | 11/2012 | Kawaida | ............... | G08C 23/04 348/734 |
| 2013/0278611 A1* | 10/2013 | Holman | ............... | G02B 6/0046 345/501 |
| 2016/0062032 A1* | 3/2016 | Dau | ............... | F21V 7/0008 362/612 |

FOREIGN PATENT DOCUMENTS

| | | |
|---|---|---|
| JP | 9-325221 | 12/1997 |
| JP | 2005-114894 A | 4/2005 |
| JP | 2007-6057 A | 1/2007 |
| JP | 2007-183470 A | 7/2007 |
| JP | 2007-324734 A | 12/2007 |
| JP | 2009-32558 A | 2/2009 |
| JP | 2009-267956 A | 11/2009 |
| JP | 2010-282869 A | 12/2010 |
| JP | 2012-244441 A | 12/2012 |

OTHER PUBLICATIONS

Written Opinion (PCT/ISA/237) dated Sep. 10, 2013 (Five (5) pages).
Extended European Search Report issued in counterpart European Application No. 13833825.6 dated Apr. 22, 2016 (Seven (7) pages).

* cited by examiner

LIGHT GUIDE BODY, RELAY APPARATUS, AND SPEAKER APPARATUS

TECHNICAL FIELD

The present invention relates to a light guide body for guiding incident light, more particularly, an infrared ray signal, and for irradiating the light from a position different from the incident position of the light.

BACKGROUND ART

In recent years, a speaker is frequently connected to an AV (Audio Visual) apparatus, such as a television set or a player, to reproduce sound with presence even in a general household. As this kind of speaker, what is called a bar speaker that is installed and used in front of a television stand has been proposed (refer to Patent Document 1). The bar speaker has a configuration in which a plurality of speakers are arranged in a housing having a bar shape. However, a light receiving section for receiving the infrared ray signal output from a remote controller is frequently provided at the lower portion of a television set; hence, in the case that the bar speaker is installed, there occurs a problem that the light receiving section is hidden by the bar speaker and the television set cannot receive the infrared ray signal transmitted from the remote controller.

Accordingly, it is conceived that a relay apparatus for relaying operation signals from the remote controller is interposed between the remote controller and the television set as described, for example, in Patent Document 2. When the user operates the remote controller and transmits an operation signal, the relay apparatus described in Patent Document 2 transmits the operation signal received from the remote controller to the television set.

PRIOR ART DOCUMENT

Patent Document

Patent Document 1: JP-A-2009-267956
Patent Document 2: JP-A-09-275591

SUMMARY OF THE INVENTION

Problem that the Invention is to Solve

However, the position of the light receiving section of the television set is not the same in all the television sets. Hence, even if such a relay apparatus as described in Patent Document 2 is installed, the installation position with respect to the width direction of the television set cannot be changed easily, whereby there is a problem that at which position the relay apparatus should be installed.

Accordingly, the present invention is intended to provide a light guide body easily capable of guiding light to a desired position regardless of the position of the light receiving section on the television set.

Means for Solving the Problem

A light guide body according to the present invention including a long light guide portion is characterized by comprising: an incident portion which is provided at a first end portion in a longitudinal direction of the light guide portion, and through which light enters; a first outgoing portion which is adapted to irradiate the light guided by the light guide portion from a first portion provided along the longitudinal direction to an outside; and a second outgoing portion which is provided at a second end portion in the longitudinal direction of the light guide portion, and which is adapted to irradiate the light to be guided toward the second end portion to the first portion.

As described above, with the light guide body according to the present invention, the light entered from the incident portion (the first end portion) is irradiated from the first portion provided along the longitudinal direction of the long light guide portion. Furthermore, with the light guide body according to the present invention, the infrared ray advancing toward the second end portion is also irradiated to the first portion by the second outgoing portion, whereby the infrared ray is irradiated in a wider range. Hence, for example, even in the case that a speaker apparatus is installed in front of the infrared ray receiving section of a television set, if the light guide body is installed so that the longitudinal direction of the light guide portion is aligned with the width direction of the television set, the infrared ray can be made to reach the light receiving section of the television set, regardless of the position of the light receiving section on the television set.

It is preferable that a second portion of the light guide portion which is provided with the second outgoing portion and located on an opposite side of the first portion should be structured so as to be inclined in a tapered shape toward the first portion. The infrared ray advancing toward the second end portion is reflected by the second portion inclined, in the tapered shape and then irradiated to the first portion. Furthermore, the infrared ray can be irradiated in a wide range beyond the longitudinal length of the light guide portion by adjusting the taper angle to less than appropriately 50 degrees.

Moreover, it is preferable that the second portion should be further inclined in a tapered shape in a direction different from a direction toward the first portion. In this case, the infrared ray can also be irradiated in directions other than the direction perpendicular to the first portion, whereby the infrared, ray can be made to reach the light receiving section of the television set even in the case that the light receiving section of the television set is located at a low position.

Besides, it may be possible that the light guide portion includes a bent portion that is formed by bending the first end portion, and the bent portion is provided with an inclined face on the first portion. With this configuration, the light can be made to enter from the direction perpendicular to the longitudinal direction of the light guide portion, whereby a light emitting section, such as an LED, can be provided inside the housing of an apparatus in which the light guide body is installed. Hence, the light emitting section does not protrude toward the outside of the housing, whereby a neat appearance is obtained.

Still further, it is preferable that the first outgoing portion should be provided with a reflection portion that is formed so that a density thereof is made higher as going farther from an incident position of the light in the longitudinal direction. Since the signal intensity of light becomes weaker as going farther from she incident position of the light, she intensity of the light irradiated from the first portion of the light guide portion can be made uniform in the longitudinal direction by increasing the number of the reflection portions as going away from the incident side.

The reflection portion may be a portion on which reflection patterns having light-scattering reflectivity are printed or a reflection portion whose flat face is surface-treated so as to be formed into an uneven shape. Alternatively, the reflection portion may be made by mixing impurities in an acrylic resin or the like serving as the material of the light guide portion.

Advantage of the Invention

With the present invention, the range in which light can be irradiated is widened, whereby the light can be guided easily to the position of the light receiving section regardless of the position of the light receiving section on the television set.

BRIEF DESCRIPTION ON OF THE DRAWINGS

FIGS. 1(A) and 1(B) are views showing an installation state of a speaker apparatus;

Figure 5:
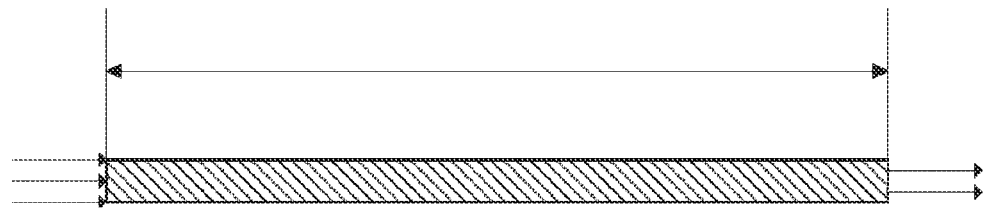
Figure 5:
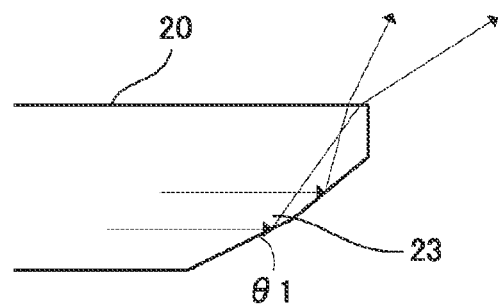
Figure 5:
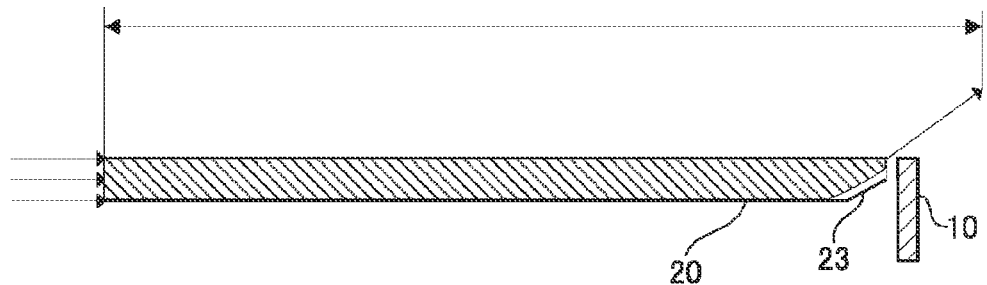
Figure 6:
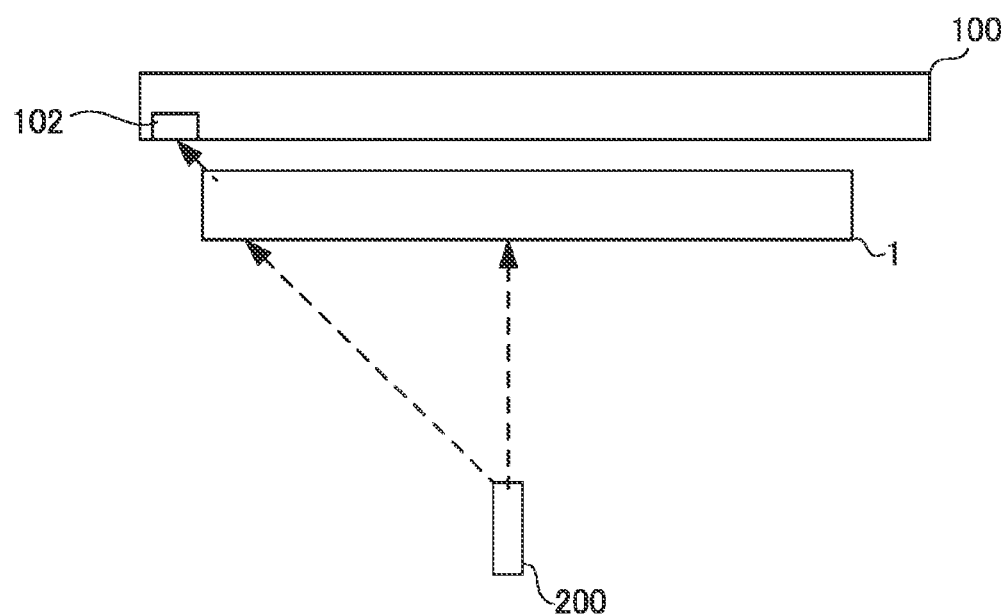
Figure 8:
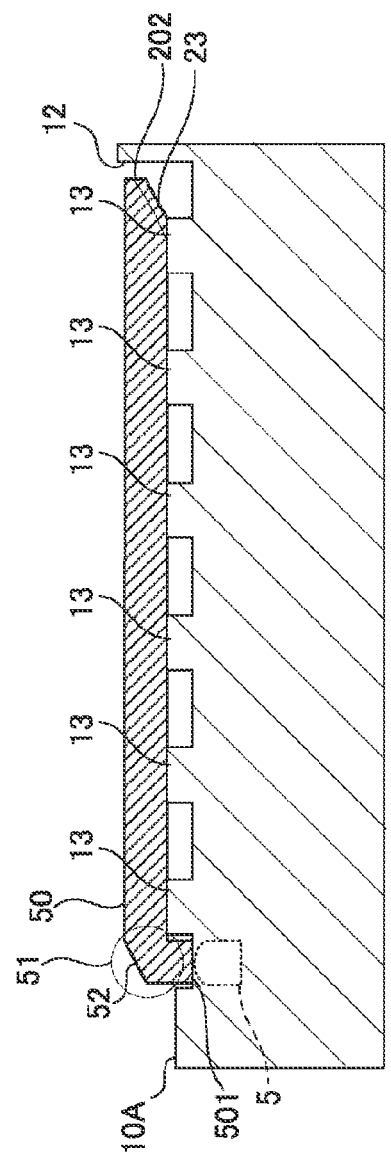
Figure 8:
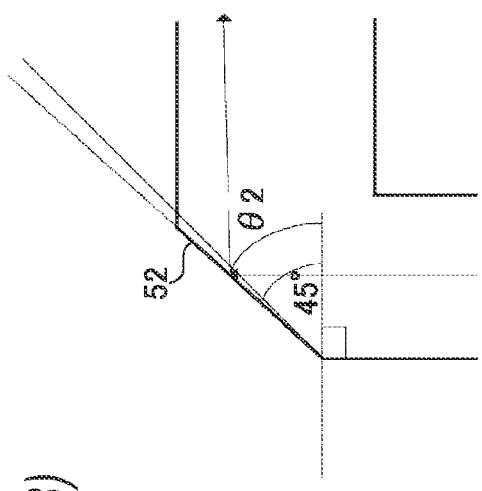
Figure 9:
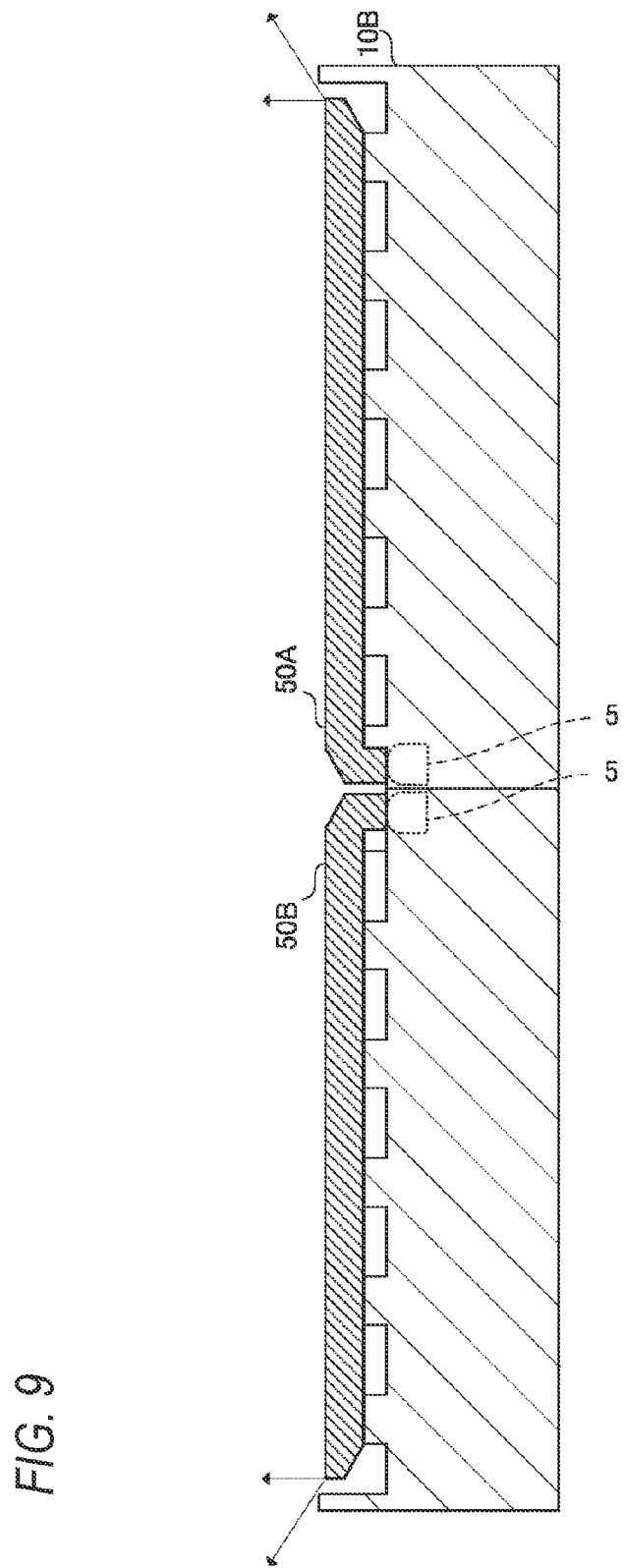
Figure 10:
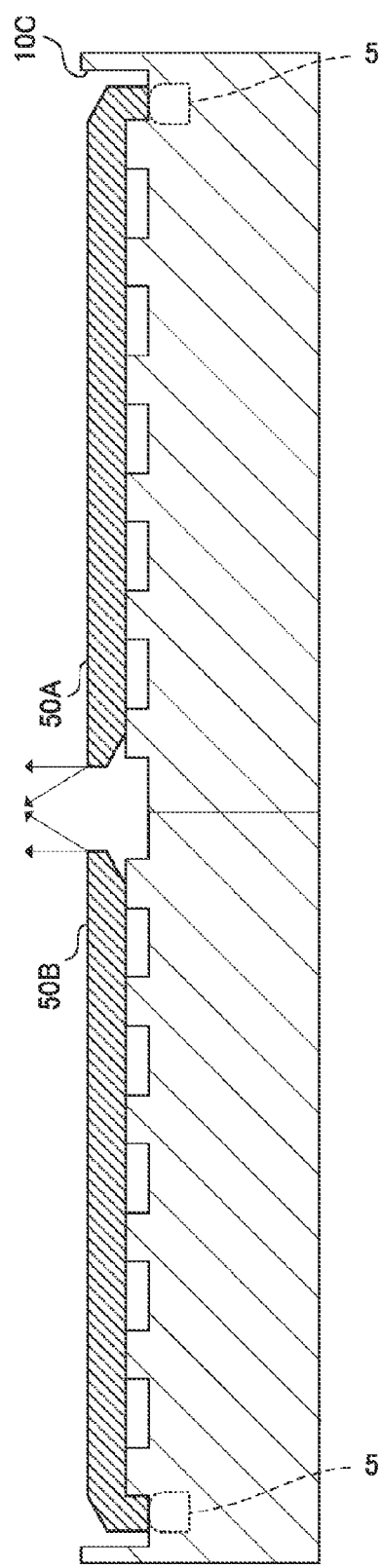

FIGS. 5(A), 5(B) and 5(C) are views showing the difference in the state in which an infrared ray is irradiated depending on the presence or absence of an inclined face 23;

FIG. 6 is a view showing a bar speaker and a television set seen from above;

FIGS. 7(A), 7(B), 7(C) and 7(D) are cross-sectional views showing the state in which an infrared ray is irradiated from the inclined face 23;

FIG. 8(A) and FIG. 8(B) are views showing an example of a light guide rod having a bent portion;

FIG. 9 is a cross-sectional view showing a speaker apparatus according to application example 1;

FIG. 10 is a cross-sectional view showing a speaker apparatus according to application example 2; and FIGS. 11(A), 11(B), 11(C) and 11(D) are cross-sectional views showing examples of the inclined face 23.

MODE FOR CARRYING OUT THE INVENTION

A relay apparatus equipped with a light guide body and a speaker apparatus equipped with the relay apparatus according to an embodiment of the present invention will be described below.

Figure 1:
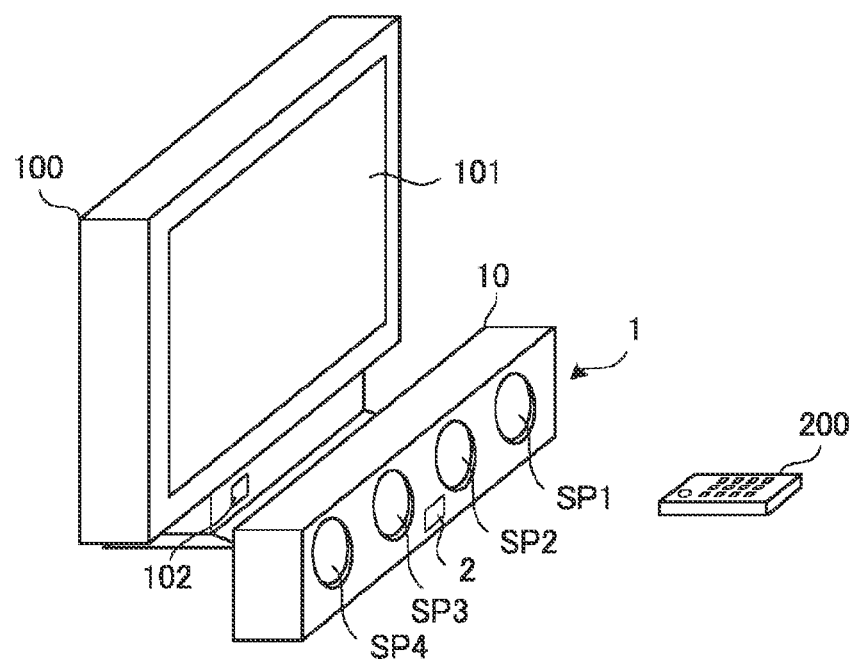
Figure 1:
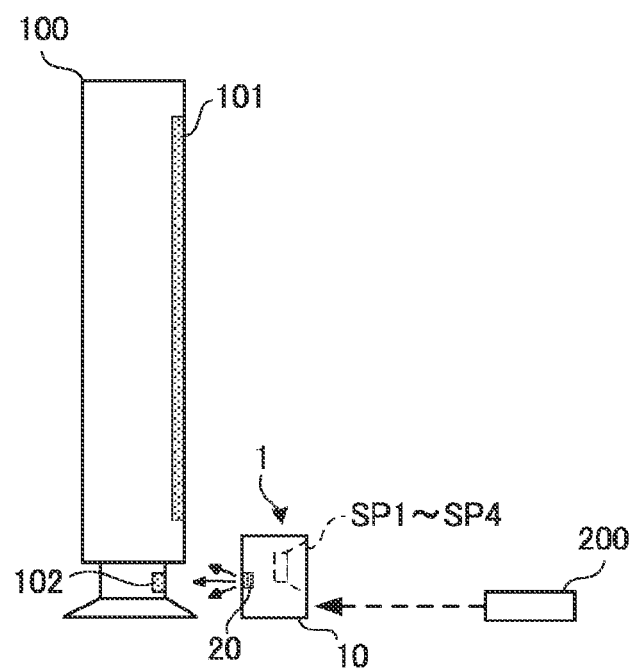

This embodiment provides a bar speaker (speaker apparatus) that is installed and used in front of a television set. FIG. 1(A) is a perspective, view showing a bar speaker 1 installed in front of a television set 100, and FIG. 1(B) is a side view thereof.

The bar speaker 1 is installed in front of the television set 100. More specifically, the bar speaker 1 is installed in front of the television stand of the television set 100 so as not to overlap the display screen 101 of the television set. 100 in the height direction.

The television set 100 is equipped with a light receiving section 102 for receiving an infrared ray signal (hereafter referred to as the infrared ray) serving as an operation signal. The infrared ray received, by the light receiving section 102 is transmitted from the remote controller 200 for the television set 100. The light receiving section 102 is provided below the display screen 101. In this embodiment, the bar speaker 1 is provided so as to be opposed to the panel on which the light receiving section 102 is provided. Hence, the light receiving section 102 cannot directly receive the infrared ray transmitted from the remote controller 300 because the infrared ray is blocked by the bar speaker 1.

The bar speaker 1 has a housing 10 having a rectangular parallelepiped shape being long in one direction. The bar speaker 1 is installed in front of the television set 100 so that the longitudinal direction of the housing 10 coincides with the width direction of the television set 100 and so that one face (hereafter, this face is referred to as the rear face) of the housing 10 is located on the side of the television set 100. The bar speaker 1 is equipped with a plurality of speakers SP1, SP2, SP3 and SP4. The speakers SP1, SP2, SP3 and SP4 are provided along the longitudinal direction of a face (hereafter referred to as the front face) being parallel to the rear face of the housing 10. The bar speaker 1 is connected to the television set 100 by wiring, not shown, receives a sound signal from the television set 100, and emits sound from the speakers SP1, SP2, SP3 and SP4 in the forward direction.

The bar speaker 1 is equipped with a light receiving section 2 for receiving the infrared ray transmitted from the remote controller 200 at the nearly central portion of the housing 10 in the longitudinal direction thereof on the front face of the housing 10 and at the lower portion thereof in the height direction. However, the position of the light receiving section 2 is not limited to the position described in this example, but the light receiving section 2 may be provided at the upper portion thereof in the height direction. The bar speaker 1 receives the infrared ray transmitted from the remote controller 200 toward the television set 100 through the light receiving section 2 as indicated by the dotted line arrow shown in FIG. 1(B).

Upon receiving the infrared ray through the light receiving section 2, the bar speaker 1 outputs the received infrared ray from the rear face of the housing 10 toward the television set 100 as indicated by the solid line arrows shown in FIG. 1(B). At this time, the bar speaker 1 linearly outputs the infrared ray along the longitudinal direction of the housing 10. As a result, even in the case that the user has installed the be speaker 1 without grasping the position of she light receiving section 102 of the television set 100 in the horizontal direction of the television set 100, the bar speaker 1 can surely make the light receiving section 102 receive the infrared ray.

Figure 2:
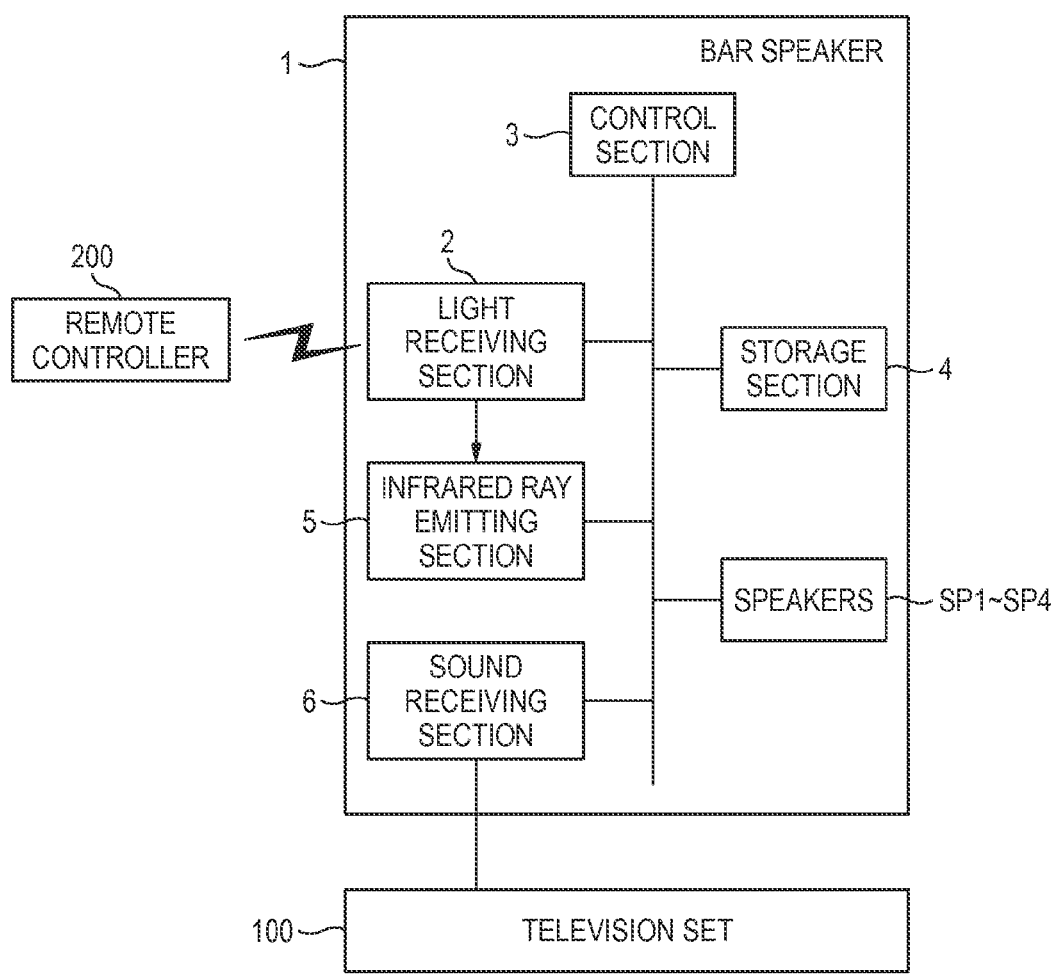
FIG. 2 is a block diagram showing the hardware configuration of the speaker apparatus.

FIG. 2 is a block diagram showing the hardware configuration of the bar speaker 1. The bar speaker 1 is equipped with the light receiving section 2, a control section 3, a storage section 4, an infrared ray emitting section 5, a sound receiving section (sound signal receiving means) 6, and the speakers SP1, SP2, SP3 and SP4.

The control section 3 executes programs stored in the storage section 4, thereby controlling the operation of the bar speaker 1. The storage section. 4 stores programs to be executed by the control section 3 and also stores various kinds of necessary data.

The infrared ray emitting section 5 reemits the infrared ray having the same information as that of the infrared ray transmitted from the remote controller 200 and received through the light receiving section 2. For example, in the case that the remote controller 200 emits the infrared ray of the control signal for changing the sound volume of the television set 100 and the bar speaker 1 receives the infrared ray, the infrared ray emitting section 5 emits the infrared ray of the control signal for changing the sound volume of the television set 100. When the infrared ray emitting section 5, provided on the rear face of the housing 10, emits the infrared ray, the infrared ray is irradiated toward the television set 100 by a light guide rod described later.

The sound receiving section 6 receives a sound signal from the television set 100. Upon receiving the sound signal by the sound receiving section 6, sound is emitted forward by the speakers SP1, SP2, SP3 and SP4.

Figure 3:
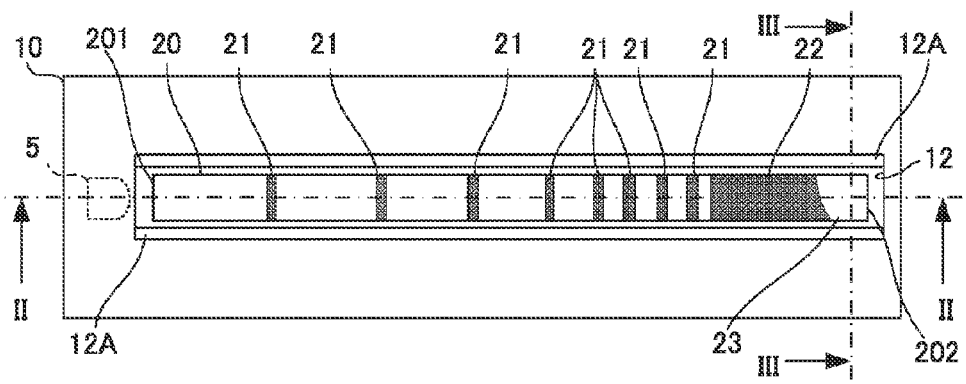
FIG. 3(A) is a rear view showing the housing of the bar speaker apparatus.
FIG. 3(B) is a cross-sectional view taken on line II-II of FIG. 3(A)
FIG. 3(C) is a cross-sectional view taken on line III-III of FIG. 3(A)
Figure 3:
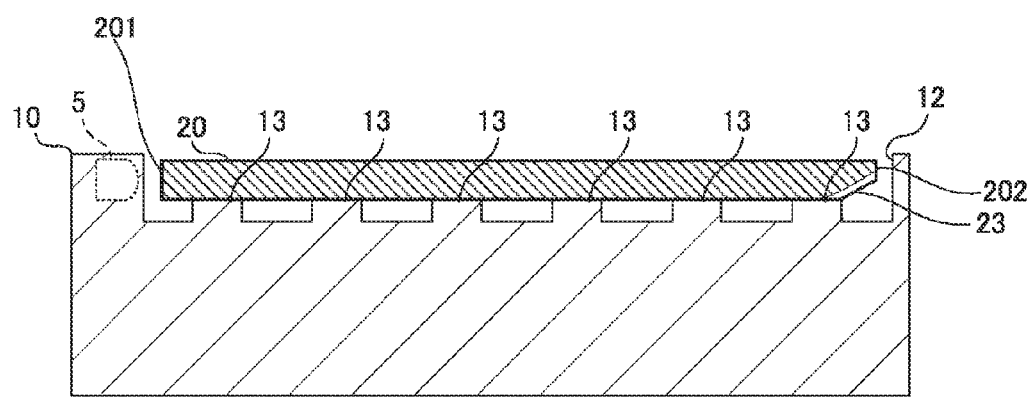
Figure 3:
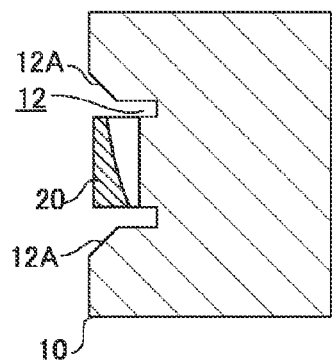

FIG. 3(A) is a rear view showing the housing 10 of the bar speaker 1, FIG. 3(B) is a cross-sectional view taken on line II-II of FIG. 3(A), and FIG. 3(C) is a cross-sectional view taken on line III-III of FIG. 3(A).

On the rear face of the housing 10 of the bar speaker 1, a concave portion 12 having a rectangular opening being long in the longitudinal direction of the housing 10 of the bar speaker 1 is provided as shown in FIG. 3(A). The concave portion 12 has a bottom face (a face in parallel with the opening) in parallel with the rear face of the housing 10 and has side faces extending along the longitudinal direction of the housing 10. On the bottom face of the concave portion 12, a plurality of convex portions 13 are formed at predetermined intervals along the longitudinal direction of the housing 10. The side faces of the concave portion 12 are perpendicular to the bottom face in the vicinity of the bottom face of the concave portion 12 and are expanded in a tapered shape toward the opening in the vicinity of the opening. The faces expanded in the tapered shape are referred to as inclined faces 12A.

The bar speaker 1 is equipped with a light guide rod 20 accommodated in the concave portion 12. The light guide rod 20 is, for example, made of an acrylic resin, and is a long light guide member extending along the longitudinal direction of the concave portion 12. The infrared ray emitted from the infrared ray emitting section 5 enters from the first end portion (hereafter referred to as the incident-side end portion 201) of the light guide rod. 20 in the longitudinal direction thereof. The incident infrared ray is guided to the second end portion (hereafter referred to as the outgoing-side end portion 202) in the longitudinal direction.

The light guide rod 20 has a rectangular shape in cross section in the direction orthogonal to the longitudinal direction of the light guide rod 20 as shown in FIG. 3(C). However, the cross-sectional shape thereof is not limited to the rectangular shape, but may be, for example, a semicircular shape, a triangular shape or a polygonal shape.

Since the light guide rod 20 is placed on the convex portions 13, space is formed between the rear face of the light guide rod 20, that is, the face on the side of the bottom face of the concave portion 12, and the bottom face of the concave portion 12, as shown in FIG. 3(B).

The height of the convex portion 13 may merely be determined to the extent that the light guide rod 20 placed on the convex portions 13 does not make contact with the bottom face of the concave portion 12, thereby not limited particularly. Furthermore, although the size of the face of each convex portion 13 making contact with the light guide rod 20 is not limited particularly, the size is preferably determined to the extent that the area thereof making contact with the light guide rod 20 can be made as small as possible. Moreover, the number of the convex portions 13 provided on the bottom face of the concave portion 12 can be changed appropriately.

The infrared ray emitted from the infrared ray emitting section 5 advances from the incident-side end portion toward the outgoing-side end portion of the light guide rod 20 while being totally reflected inside the light guide rod 20. At this time, since the light guide rod 20 is placed on the convex portions 13 as described above, space is formed between the rear face of the light guide rod 20 and the bottom face of the concave portion 12, whereby the contact area between the rear face of the light guide rod 20 and the bottom face of the concave portion 12 is made small. This configuration suppresses that the infrared ray is refracted by the contact face between the light guide rod 20 and the concave portion 12 and that the infrared ray is irradiated unexpectedly from the light guide rod 20.

In addition, reflection patterns 21 are provided at a plurality of positions on the rear face (second portion) of the light guide rod 20. Although it is preferable that the reflection patterns 21 should have light-scattering reflectivity and should be printed, the rear face of the light guide rod 20 may be surface-treated so as to be formed into an uneven shape. When the infrared ray advancing while being totally reflected hits the reflection patterns 21, the infrared ray is reflected irregularly and irradiated from the face (hereafter referred to as the side face (first portion)) serving as the face on the opposite side of the above-mentioned rear face of the light guide rod 20 while being expanded radially. Hence, the portion provided with the reflection patterns 21 functions as a first outgoing portion. Furthermore, the infrared ray may irradiated from the side face of the light guide rod 20 by using the light guide rod 20 that is formed by mixing impurities into an acrylic resin or the like.

At this time, since the inclined faces 12A are formed in the vicinity of the opening of the concave portion 12, the infrared ray irradiated while being expanded from the side face of the light guide rod 20 is not blocked by the side faces of the concave portion 12. For this reason, in the case that the infrared ray is irradiated radially from the light guide rod 20, the infrared ray can be irradiated not only in the normal direction of the rear face of the housing 10 but also in the height direction thereof. Hence, even in the case that the light guide rod 20 is not opposed to the light, receiving section. 102 of the television set 100 and is positioned so as to be deviated away therefrom in the height direction, the light receiving section 102 can receive the infrared ray from the light guide rod 20.

Figure 4:
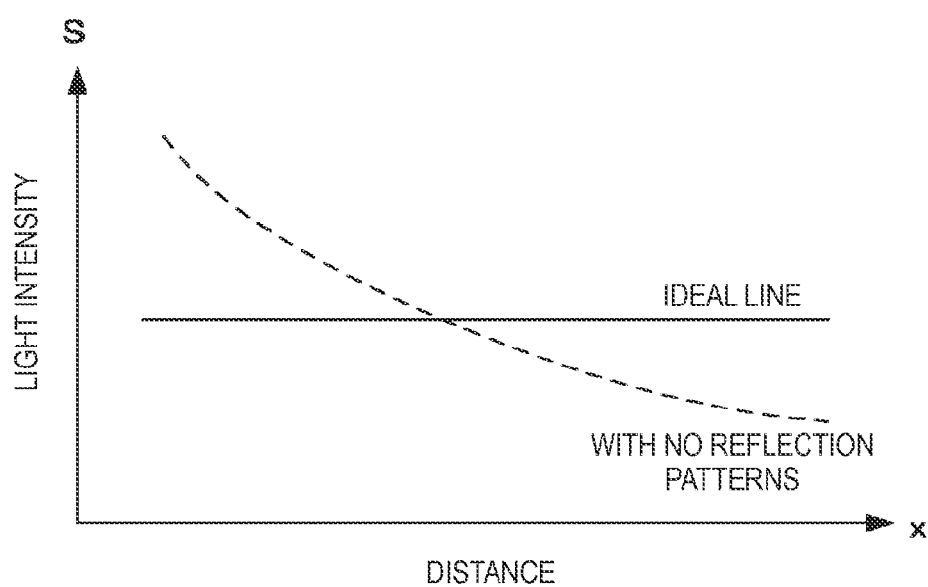
FIG. 4 is a graph showing the light intensity of the infrared ray irradiated from a light guide rod.

The arrangement pattern of the reflection patterns 21 is determined, for example, as described below. FIG. 4 is a graph showing the light intensity of the infrared ray irradiated from the side face of the light guide rod 20. In FIG. 4, the horizontal axis represents the distance x from the incident-side end portion in the longitudinal direction, and the vertical axis represents the light intensity S of the infrared ray.

The dotted line in FIG. 4 indicates the light intensity of the infrared ray at the distance x in the case that the reflection patterns 21 are not formed. In this case, the signal intensity of the infrared ray incident from the incident-side end portion 201 decreases exponentially in the direction from the incident-side end portion 201 to the outgoing-side end portion 202. In order that the infrared ray can be received surely regardless of the position of the light receiving section 102 on the television set 100 in the width direction of the television set 100, the light intensity of the infrared ray irradiated from the side face of the light guide rod 20 is preferably constant at all times, regardless of the distance x from the incident-side end portion 201 as indicated by the solid line shown in FIG. 4.

Hence, the relationship between the density M of the reflection patterns 21 and the distance x from the incident-side end portion is assumed to be expressed by an exponential function expression, $M = Ae^{Bx}$. The light intensity S of the infrared ray irradiated from the side face of the light guide rod 20 is stronger as the density M of the reflection patterns 21 is higher. In the case that the coefficient A of the above-mentioned expression is made smaller, the density M, that is, the light intensity S, can be made smaller when the distance x is small. Furthermore, in the case that the coefficient B is made larger, the density M, that is, the light intensity S, can be made larger when the distance x is large. The light intensity S can be made constant regardless of the distance x as indicated by the solid line shown in FIG. 4 by adjusting the coefficients A and B depending on the material of the light guide rod 20 or the type of the reflection patterns 21.

In order that the intensity of the infrared ray irradiated from the light guide rod 20 is made constant regardless of the distance x, the reflection patterns 21 are not only formed discretely, but in the case that the light guide rod 20 is formed by mixing impurities in an acrylic resin or the like, the concentration of the impurities to be mixed may be changed.

Furthermore, in the area around the outgoing-side end portion 202 of the light guide rod 20, a reflection pattern 22 is preferably formed uniformly regardless of the above-mentioned expression. With this configuration, the infrared ray having entered from the incident-side end portion 201 and having reached the area around the outgoing-side end portion 202 without being reflected by the reflection patterns 21 can be reflected by the reflection pattern 22 and can be irradiated from the side face of the light guide rod 20, whereby the infrared ray having entered from the infrared ray emitting section 5 to the light guide rod 20 can be irradiated from the side face of the light guide rod 20 without any waste.

Furthermore, in the vicinity of the outgoing-side end portion 202 of the light guide rod 20, the rear face thereof is formed into an inclined face 23 being inclined in a tapered shape toward the side face. This inclined face 23 functions as a second outgoing portion for reflecting the infrared ray advancing toward the outgoing-side end portion 202 and for making then infrared ray irradiated to the side face. No reflection pattern is formed on the inclined face 23.

FIGS. 5(A), 5(B) and 5(C) are views showing the difference in the state in which the infrared ray is irradiated depending on the presence or absence of the inclined face 23. If the inclined face 23 is not provided as shown in FIG. 5(A), the infrared ray having advanced perpendicularly toward the flat face of the outgoing-side end portion 202 is directly irradiated from the outgoing-side end portion 202. Moreover, since the infrared ray is only reflected by the reflection pastern 22 on the rear face and irradiated in the vicinity of the outgoing-side end portion 202, the infrared ray being irradiated is not expanded beyond the longitudinal, width of the light guide rod 20.

However, in the case that the inclined face 23 is provided as shown in FIG. 5(B), the infrared ray having advanced toward the flat face of the outgoing-side end portion 202 is reflected by the inclined face 23.

For example, when it is assumed that the critical angle at which the infrared ray is totally reflected on the boundary face between the light guide rod 20 and the air is approximately 50 degrees, the taper angle θ1 of the inclined face 23 is set to less than 50 degrees so that the infrared, ray having advanced toward the flat face of the outgoing-side end portion 202 is reflected by the side face of the light guide rod 20 (in this example, θ1 is set to approximately 30 degrees). The infrared ray reflected by the inclined face 23 is refracted by the side face of the light guide rod 20 and then irradiated, thereby irradiated while being expanded toward the outgoing-side end portion 202. Hence, the bar speaker 1 can irradiate the infrared ray in a wide range beyond the longitudinal width of the housing 10 as shown in FIG. 5(C).

As a result, as shown in FIG. 6, even in the case that the width of the television set 100 is wider than the width of the housing of the bar speaker 1 and the light receiving section 102 of the television set 100 is hidden by the depth of the housing 10, the bar speaker 1 can send light to the hidden portions.

On the other hand, as shown in FIG. 3(C), the rear face of the light guide rod 20 in the vicinity of the outgoing-side end portion 202 is further inclined in a tapered shape in a direction different from the direction toward the side face. In other words, as shown in FIG. 3(C), the light guide rod 20 is inclined upward in a tapered shape.

Figure 7:
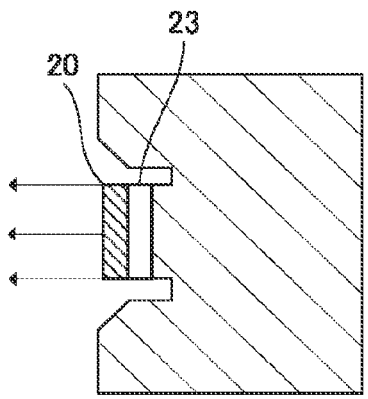
Figure 7:
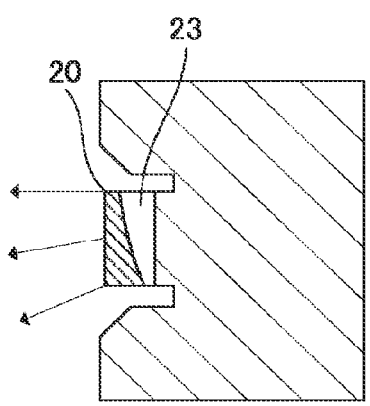
Figure 7:
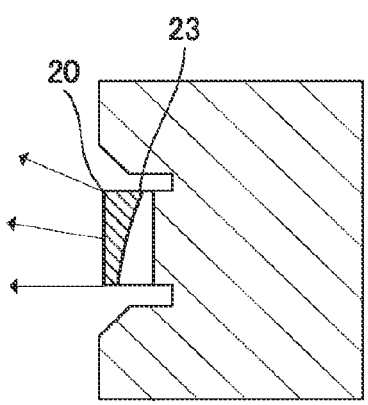
Figure 7:
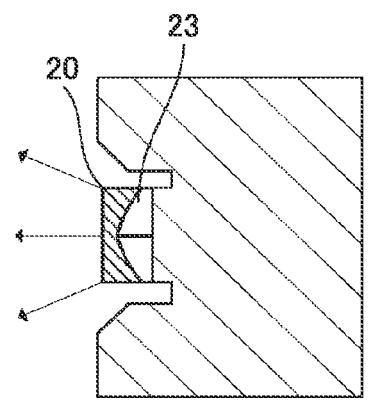

If the inclined face 23 is not inclined upward in a tapered shape as shown in FIG. 7(A), the infrared ray irradiated from the inclined face 23 is irradiated nearly perpendicularly to the side face of the light guide rod 20. Hence, the infrared ray is irradiated only in the normal direction of the rear face of the housing 10.

However, as shown in FIG. 7(B), in the case that the inclined face 23 is inclined upward in a tapered shape, the infrared ray having advanced, toward the flat face of the outgoing-side end portion 202 in a direction perpendicular thereto is reflected by she face inclined upward and further refracted at the side face of the light guide rod 20 and then irradiated, thereby irradiated while being expanded downward. As a result, the infrared ray is irradiated not only in the normal direction of the rear face of the housing 10 but also in the height direction thereof. Hence, even in the case that the light guide rod 20 is not opposed to the light, receiving section 102 of the television set 100 and is positioned so as to be deviated away therefrom in the height direction, the light receiving section 102 can receive the infrared ray from the light guide rod 20.

Furthermore, as shown in FIG. 7(C), in the case that the inclined face 23 is inclined downward in a tapered shape, the infrared ray having advanced, toward the flat face of the outgoing-side end portion 202 in a direction perpendicular thereto is reflected by the face inclined downward and further refracted at the side face of the light guide rod 20 and then irradiated, thereby irradiated while being expanded upward. Moreover, as shown in FIG. 7(D), in the case that the inclined face 23 is inclined upward and downward in a tapered shape, the infrared ray having advanced toward the flat face of the outgoing-side end portion 202 in a direction perpendicular thereto is irradiated while being expanded upward and downward.

Figure 11:
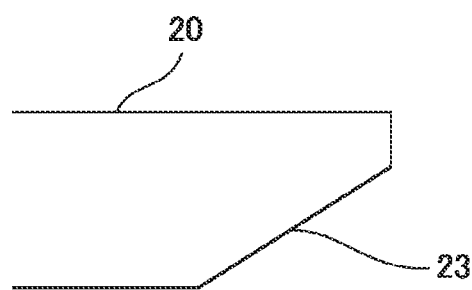
Figure 11:
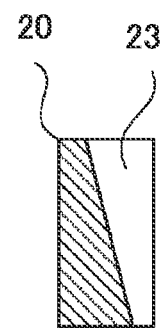
Figure 11:
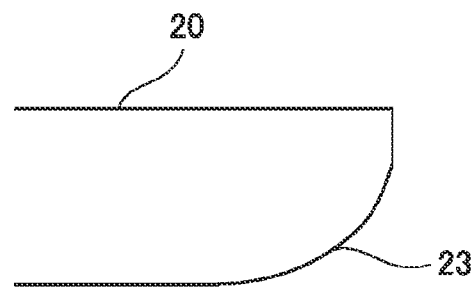
Figure 11:
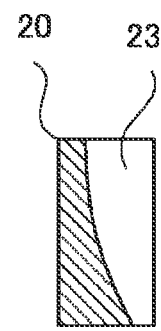

The surface shape of the inclined face 23 may be such a flat face as shown in FIGS. 11(A) and 11(B) or may be such a curved face as shown in FIGS. 11(C) and 11(D).

Furthermore, although the effect in which the infrared ray is irradiated while being expanded beyond the longitudinal width of the light guide rod 20 is realized in the above-mentioned example by providing the inclined face 23 in the vicinity of the outgoing-side end portion 202 of the light guide rod 20, the present invention is not limited to this example in which the inclined face 23 is provided. It may be possible to use a structure in which the infrared ray is refracted in the vicinity of the outgoing-side end portion 202 of the light guide rod 20 and is irradiated while being expanded beyond the longitudinal width of the light guide rod 20. For example, it is conceivable that the material of the light guide rod is changed at the portion in the vicinity of the outgoing-side end portion 202 of the light guide rod 20 or that an element for refracting the light is additionally provided in the vicinity of the outgoing-side end portion 202 of the light guide rod 20.

Furthermore, although the light from the infrared ray emitting section 5 directly enters from the end portion of the light guide rod 20 in the above-mentioned example, it may be possible that the light enters in the middle of the light guide rod 20 or that the light from the infrared ray emitting section 5 is reflected by a reflecting member and then enter the light guide rod 20.

Moreover, it is possible to use a light guide rod having such a bent portion as shown in FIGS. 8(A) and 8(B) FIG. 8(A) is a cross-sectional view (corresponding to FIG. 3(A)) showing a bar speaker, and FIG. 8(B) is an enlarged cross-sectional view showing the bent portion in FIGS. 8(A) and 8(B) components common to those shown in FIG. 3(B) are designated by the same reference numerals and their descriptions are omitted.

The incident-side end portion 501 of the light guide rod 50 shown in FIGS. 8(A) and 8(B) is bent approximately 90 degrees and formed into a bent portion 51. Hence, the face of the incident-side end portion 501 is oriented toward the housing 10A of the bar speaker. In this case, the infrared ray emitting section 5 is installed inside the housing 10A so as to output the infrared ray in a direction in which the rear face of the housing 10A is oriented.

In addition, an inclined flat face 52 is provided on the side face of the light guide rod 50 at the bent portion 51. As shown in FIG. 8(B), the inclined flat face 52 reflects the infrared ray having been output from the infrared ray emitting section 5 and having entered from the incident-side end portion 501 and then guides the infrared ray in the longitudinal direction. The inclination angle θ2 of the inclined flat face 52 is slightly larger than 45 degrees (for example, by approximately 3 degrees). Hence, the infrared ray reflected by the inclined flat face 52 advances while being slightly inclined from the longitudinal direction, whereby a more amount of infrared ray is applied to the reflection patterns 21 and the reflection pattern 22, and a more amount of infrared ray is irradiated to the side face of the light guide rod 50.

It is preferable that the taper angle θ1 of the inclined face 23 should be set corresponding to the inclination angle θ2 of the inclined flat face 52.

With the light guide rod 50 shown in FIGS. 8(A) and 8(B), the infrared ray emitting section 5 can be provided inside the housing 10A, whereby the infrared ray emitting section 5 does not protrude toward the rear face of the housing 10A, whereby a neat appearance is obtained.

Next, FIG. 9 is a cross-sectional view (corresponding to FIG. 3(B)) showing a bar speaker according to application example 1. In the bar speaker according to application example 1, two infrared ray emitting sections 5 are provided at the central portion of a housing 10B. Furthermore, a light guide rod 50A and a light guide rod 50B for guiding the infrared rays output from the respective infrared ray emitting sections 5 are installed. The light guide rod 50A and the light guide rod 50B have the same configuration and function as those of the light guide rod 50 shown in FIGS. 8(A) and 8(B). The light guide rod 50A and the light guide rod 50B are installed on the housing 10B in directions different from each other, that is, in directions so that the infrared rays are guided toward the outside of the housing 10B.

Also in this case, an infrared ray having a constant light intensity is radiated regardless of the position in the longitudinal direction of the rear face of the housing 10B. Furthermore, the infrared ray can be irradiated in a wide range beyond the longitudinal width of the housing 10B in both the left and right sides of the housing 10B.

Next, FIG. 10 is a cross-sectional view (corresponding to FIG. 3(B)) showing a bar speaker according to application example 2. In the bar speaker according to application example 2, two infrared ray emitting sections 5 are provided in the vicinity of the left and right end portions of a housing 10C. Furthermore, the light guide rod 50A and the light guide rod 50B for guiding the infrared rays output from the respective infrared ray emitting sections 5 are installed. However, in this example, the light guide rod 50A and the light guide rod 50B are installed so as to be left-right inverted in comparison with the example shown in FIG. 9, and also installed on the housing 10C so that the infrared rays are guided toward the inside of the housing 10C.

Also in this case, an infrared ray having a constant light intensity is irradiated regardless of the position in the longitudinal direction of the rear face of the housing 10C. Furthermore, at the longitudinally central portion of the housing 10C, the infrared ray can be irradiated in the direction in which the rear face of the central portion of the housing 10C is oriented even if the light guide rod 50A and the light guide rod 50B are not installed.

The present application is based on Japanese Patent Application (JP-A-2012-190485) filed on Aug. 30, 2012, and the contents thereof are herein incorporated by reference.

INDUSTRIAL APPLICABILITY

With the present invention, the range in which light can be irradiated is widened, whereby the light can be guided easily to the position of the light receiving section regardless of the position of the light receiving section on the television set.

DESCRIPTION OF REFERENCE NUMERALS AND SIGNS

1 . . . bar speaker
2 . . . light receiving section
3 . . . control section
4 . . . storage section
5 . . . infrared ray emitting section
6 . . . sound receiving section
SP1, SP2. SP3, SP4 . . . speaker
10 . . . housing
12 . . . concave portion
12A . . . inclined face
13 . . . convex portion
20 . . . light guide rod
21, 22 . . . reflection pattern
23 . . . inclined face
100 . . . television set
101 . . . display screen
102 . . . light receiving section
200 . . . remote controller
201 . . . incident-side end portion
202 . . . outgoing-side end portion
300 . . . remote controller

The invention claimed is:

1. A relay apparatus comprising:
a housing;
a light signal receiving unit, provided on a first face of the housing, and receiving a light signal from an outside of the housing;
a light emitting unit emitting light depending on the light signal received by the light signal receiving unit, and
a light guide body including a long light guide portion, the light guide body comprising:

an incident portion which is provided at a first end portion in a longitudinal direction of the light guide portion, and through which light enters;

a first outgoing portion which is adapted to irradiate the light guided by the light guide portion from a first portion provided along the longitudinal direction to an outside; and a second outgoing portion which is provided at a second end portion in the longitudinal direction of the light guide portion, and which is adapted to irradiate the light to be guided toward the second end portion to the first portion, wherein the light guide body is provided on a second face different from the first face of the housing, and the light emitted by the light emitting unit enters the incident portion.

2. The relay apparatus according to claim 1, wherein a second portion of the light guide portion which is provided with the second outgoing portion and located on an opposite side of the first portion is inclined in a tapered shape toward the first portion.

3. The relay apparatus according to claim 2, wherein the second portion which is located on the opposite side of the first portion is further inclined in a tapered shape in a direction different from a direction toward the first portion.

4. The relay apparatus according to claim 1, wherein the light guide portion includes a bent portion that is formed by bending the first end portion, and the bent portion is provided with an inclined face on the first portion.

5. The relay apparatus according to claim 1, wherein the first outgoing portion is provided with a reflection portion that is formed so that a density thereof is made higher as going farther from an incident position of the light in the longitudinal direction.

6. A speaker apparatus comprising:
the relay apparatus according to claim 1;
a sound signal receiving unit receiving a sound signal from an outside, and
a sound outputting unit outputting the sound signal received by the sound signal receiving unit as sound.

* * * * *